(12) United States Patent
Masuzaki et al.

(10) Patent No.: US 9,233,454 B2
(45) Date of Patent: Jan. 12, 2016

(54) GRINDING STONE, MANUFACTURING METHOD OF GRINDING STONE, AND MANUFACTURING APPARATUS OF GRINDING STONE

(75) Inventors: Masahiko Masuzaki, Tochigi (JP); Fumio Sato, Tochigi (JP); Satoru Uchiumi, Tochigi (JP); Nobuhiro Asai, Tochigi (JP); Koji Saito, Tochigi (JP); Satoshi Kanbayashi, Tochigi (JP); Toshiya Hirata, Tochigi (JP); Takashi Yoshida, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1076 days.

(21) Appl. No.: 13/257,737

(22) PCT Filed: Mar. 31, 2010

(86) PCT No.: PCT/JP2010/055956
§ 371 (c)(1),
(2), (4) Date: Nov. 30, 2011

(87) PCT Pub. No.: WO2010/114075
PCT Pub. Date: Oct. 7, 2010

(65) Prior Publication Data
US 2012/0071074 A1 Mar. 22, 2012

(30) Foreign Application Priority Data
Mar. 31, 2009 (JP) ................. 2009-085762
Mar. 31, 2009 (JP) ................. 2009-086373
Mar. 31, 2009 (JP) ................. 2009-086561

(51) Int. Cl.
*B24D 3/00* (2006.01)
*B24D 15/02* (2006.01)
(Continued)

(52) U.S. Cl.
CPC .. *B24D 3/00* (2013.01); *B24D 5/14* (2013.01); *B24D 7/14* (2013.01); *B24D 18/0018* (2013.01); *C09G 1/02* (2013.01)

(58) Field of Classification Search
CPC .............. B24D 3/00; B24D 5/00; B24D 5/14; B24D 7/00; B24D 7/14; B24D 15/02; C09G 1/02; B24B 33/086; B24B 37/14
USPC ............ 451/540, 541, 547, 548, 552; 51/295, 51/308
See application file for complete search history.

(56) References Cited

U.S. PATENT DOCUMENTS 6,723,144 B2 * 4/2004 Katagiri et al. ................. 51/308
6,945,857 B1 * 9/2005 Doan et al. ...................... 451/56
(Continued)

FOREIGN PATENT DOCUMENTS

CN 1286158 3/2001
CN 1872496 12/2006
(Continued)

OTHER PUBLICATIONS
Chinese Office Action dated Apr. 16, 2013, 9 pages.

*Primary Examiner* — Eileen Morgan
(74) *Attorney, Agent, or Firm* — Rankin, Hill & Clark LLP

(57) ABSTRACT

A manufacturing apparatus, of a grinding stone which is manufactured by attaching abrasive grains respectively having polyhedral shapes in which mutually opposed surfaces are parallel to each other to a base member, is provided with: an abrasive grains classifying apparatus adapted to classify the abrasive grains based on sizes of the abrasive grains defined by face-to-face distances between the mutually opposed surfaces; and an attaching apparatus adapted to attach the abrasive grains classified by the abrasive grains classifying apparatus to the base member. The attaching apparatus is provided with: a template which is disposed above the base member to be movable with respect to the base member and formed with a guide hole through which the classified abrasive grains pass; a vibration generator connected to the template or the base member and adapted to apply a vibration to the abrasive grains passing through the template; and an electrolytic deposition bath adapted to electrolytic deposit the abrasive grains passing through the template.

15 Claims, 12 Drawing Sheets

(51) Int. Cl.
*C09G 1/02* (2006.01)
*B24D 5/14* (2006.01)
*B24D 7/14* (2006.01)
*B24D 18/00* (2006.01)

(56) References Cited

U.S. PATENT DOCUMENTS

| | | | | |
|---|---|---|---|---|
| 7,201,645 | B2* | 4/2007 | Sung | 451/443 |
| 7,404,831 | B2* | 7/2008 | Chen | 51/298 |
| 7,491,116 | B2* | 2/2009 | Sung | 451/56 |
| 8,043,145 | B2* | 10/2011 | Sung | 451/443 |
| 8,298,048 | B2* | 10/2012 | Sung | 451/443 |
| 2005/0095959 | A1* | 5/2005 | Sung | 451/56 |
| 2005/0227590 | A1* | 10/2005 | Sung | 451/41 |
| 2006/0073774 | A1* | 4/2006 | Sung | 451/56 |
| 2006/0137256 | A1 | 6/2006 | Yui et al. | |
| 2007/0254566 | A1* | 11/2007 | Sung | 451/443 |
| 2009/0186561 | A1* | 7/2009 | Sung | 451/56 |
| 2011/0045745 | A1* | 2/2011 | De Messemaeker et al. | 451/41 |
| 2012/0096774 | A1* | 4/2012 | Hoglund et al. | 51/308 |
| 2012/0100787 | A1* | 4/2012 | Sung | 451/56 |
| 2013/0316629 | A1* | 11/2013 | Sung | 451/443 |

FOREIGN PATENT DOCUMENTS

| | | |
|---|---|---|
| JP | 2000-84831 | 3/2000 |
| JP | 2001-71267 | 3/2001 |
| JP | 2003-181765 | 7/2003 |
| JP | 2003-285271 | 10/2003 |
| JP | 2005-279842 | 10/2005 |
| TW | 503161 | 9/2002 |

* cited by examiner

GRINDING STONE, MANUFACTURING METHOD OF GRINDING STONE, AND MANUFACTURING APPARATUS OF GRINDING STONE

TECHNICAL FIELD

The present invention relates to a grinding stone in which abrasive grains having polyhedral shapes are attached to a base member, and a manufacturing technique thereof.

BACKGROUND ART

A grinding stone is manufactured by attaching abrasive grains having polyhedral shapes to a base member. (For example, refer Patent Document 1: JP-A-2005-279842 (FIG. 4).)

Patent Document 1 is explained referring to FIG. 15(a) and FIG. 15(b). As shown in FIG. 15 (a), abrasive grains 202 are attached to an upper surface of a base member 201 through a plated layer 203. Then, as shown in FIG. 15(b), leading ends of the abrasive grains 202 are cut to align heights of the abrasive grains 202, thereby a grinding stone 205 is manufactured.

The inventors of the present invention have checked abrasive grains on the market for variations in their sizes. The check result has found that a grain diameter (for example, 200 μm) of an abrasive grain having the greatest grain diameter is two times or more than a grain diameter (for example, 50 μm) of an abrasive grain having the smallest grain diameter. In order to align the heights of the abrasive grains, it is necessary to adjust the heights of the abrasive grains to the height of the abrasive grain having the smallest grain diameter. Therefore, in some cases, for the height adjustment, the abrasive grain having the largest grain diameter is cut by half or more. That is, since projecting amount of the abrasive grains from the base member are different from each other, there are inevitably generated the abrasive grains that are cut greatly, which results in waste cutting.

It is desired to provide a grinding stone and a technique for manufacturing the grinding stone in which cutting amounts of the abrasive grains can be small.

PRIOR ART DOCUMENT

Patent Document

Patent Document 1: JP-A-2005-279842

SUMMARY OF INVENTION

One or more embodiments of the invention provide a grinding stone and a technique for manufacturing the grinding stone in which cutting amounts of abrasive grains can be small.

In accordance with one or more embodiments of the invention, a grinding stone is provided with a base member; and abrasive grains, wherein each of the abrasive grains is attached to the base member, each of the abrasive grains has a polyhedral shape in which mutually opposed surfaces are parallel to each other, and face-to-face distances between the mutually opposed surfaces are different from each other depending on the surfaces in each of the abrasive grains. In each of the abrasive grains, a minimum distance of said distances is a value within a predetermined range. Most of the abrasive grains are arranged so that a projecting height of each of the abrasive grains from the base member corresponds to said minimum distance. In this structure, a difference between a maximum value and a minimum value of said predetermined range may be substantially 10 μm. Said most of the abrasive grains may comprise 80% or more of all abrasive grains in the grinding stone.

According to this structure, in each of the abrasive grains, a minimum distance of the face-to-face distances between the mutually opposed surfaces is a value within a predetermined range. That is, precisely classified abrasive grains are used. Thereby, variations of sizes of the abrasive grains can be suppressed, so that the cutting amount of the abrasive grains can be small.

In addition, the most of the abrasive grains are arranged so that the minimum distance of the face-to-face distances between the mutually opposed surfaces corresponds to the projecting height from the base member. By setting the projecting heights of the abrasive grains from the base member to the minimum heights of the abrasive grains, the projecting heights can be aligned so that the cutting amount of the abrasive grains can be reduced.

Moreover, in accordance with one or more embodiments of the invention, a grinding stone is provided with: a base member; and abrasive grains, wherein each of the abrasive grains is attached to the base member, each of the abrasive grains has a polyhedral shape in which mutually opposed surfaces are parallel to each other, and face-to-face distances between the mutually opposed surfaces are different from each other depending on the surfaces in each of the abrasive grains. In each of the abrasive grains, a minimum distance of said distances is a value within a predetermined range. The abrasive grains are arranged so that a projecting height of each of the abrasive grains from the base member corresponds to said minimum distance. Further, in this structure, a difference between a maximum value and a minimum value of said predetermined range may be substantially 10 μm.

According to this structure, the abrasive grains are arranged so that the minimum distance of the face-to-face distances between the mutually opposed surfaces corresponds to the projecting height from the base member. By setting the projecting heights of the abrasive grains from the base member to the minimum heights of the abrasive grains, the projecting heights can be aligned so that the cutting amount of the abrasive grains can be reduced.

Moreover, in accordance with one or more embodiments of the invention, a grinding stone is provided with: a base member; and abrasive grains, wherein each of the abrasive grains is attached to the base member and has a truncated octahedron shape including hexagonal surfaces and quadrangle surfaces in which mutually opposed surfaces are parallel to each other, and face-to-face distances between the mutually opposed surfaces are different from each other depending on the surfaces in each of the abrasive grains. In each of the abrasive grains, a minimum distance of said distances is a value within a predetermined range. One of said hexagonal surfaces is attached to the base member. Further, in this structure, a difference between a maximum value and a minimum value of said predetermined range may be substantially 10 μm.

According to this structure, the abrasive grains in each of which the minimum distance is within a predetermined range are used and the hexagonal surfaces are attached to the base member. That is, the hexagonal surfaces of the abrasive grains of the truncated octahedron shapes the sizes of which are equalized are attached to the base member. A distance between the hexagonal surfaces of one abrasive grain approximates with a distance between the hexagonal surfaces of the other abrasive grain having a size which is substantially the same with said one abrasive grain. Accordingly, by making the hexagonal surfaces to come into contact, the projecting heights from the base member can be controlled by the approximate distances. The projecting heights of the abrasive grains from the base member are adjusted by the approximate distances, and the cutting amount of the abrasive grains for aligning the height can be reduced.

Moreover, in accordance with one or more embodiments of the invention, a grinding stone is provided with: a base member; and abrasive grains, wherein each of the abrasive grains is attached to the base member, each of the abrasive grains has a polyhedral shape in which mutually opposed surfaces are parallel to each other, and face-to-face distances between the mutually opposed surfaces are different from each other depending on the surfaces in each of the abrasive grains. The abrasive grains including an abrasive grain having a minimum projecting height from the base member up to an abrasive grain having a maximum projecting height from the base member are arranged on the base member in arbitrary manners. Further, in this structure, the abrasive grains may include a plurality of groups classified based on a minimum distance of said distances in each of the abrasive grains. The abrasive grains may be arranged on the base member in a sequence from the abrasive grains of a group having the smallest minimum distance to the abrasive grains of a group having the greatest minimum distance so that an outer shape of the grinding stone has a taper shape. In addition, in each of the groups, a minimum distance of said distances may be a value within a predetermined range in each of the abrasive grains, and a difference between a maximum value and a minimum value of said predetermined range may be substantially 10 µm.

According to this structure, the abrasive grains including an abrasive grain having a minimum projecting height from the base member up to an abrasive grain having a maximum projecting height from the base member are arranged on the base member in arbitrary manners. That is, the abrasive grains having sized from small abrasive grains to large abrasive grains are arranged in the arbitrary manners. Thereby, for example, the abrasive grains can be arranged such that the outer shape of the grinding stone has a taper shape. If the abrasive gains should be cut to form the taper shape, by arranging leading ends of the abrasive grains to be the taper shape in advance, the cutting amount of the abrasive grains can be reduced.

Moreover, in accordance with one or more embodiments of the invention, a manufacturing method of a grinding stone, which is manufactured by attaching abrasive grains respectively having polyhedral shapes in which mutually opposed surfaces are parallel to each other to a base member, is provided with: a classifying step of classifying the abrasive grains based on sizes of the abrasive grains defined by face-to-face distances between the mutually opposed surfaces; and an attaching step of attaching the abrasive grains classified in the classifying step to the base member. The attaching step includes: a placement step of placing the abrasive grains classified in the classifying step onto an upper surface of the base member using a template disposed above the base member; a vibrating step of applying a vibration to the placed abrasive grains and making broader surfaces of the respective abrasive grains to come in contact with the base member; and an electrolytic deposition step of electrolytic depositing the abrasive grains to which the vibration is applied.

According to this method, the vibration is applied to the abrasive grains and the broader surfaces of the respective abrasive grains are made to come in contact with the base member. In the abrasive grains of the polyhedral shapes, the face-to-face distances between the mutually opposed surfaces may be different to each other. In this case, the distance between broader surfaces is smaller than the distance between narrower surfaces. That is, by making the broader surface of the abrasive grain to come into contact, the projecting amount from the base member can be smallest. Thus, the projecting heights of the abrasive grains from the base member are adjusted to the smallest heights of the abrasive grains, so that the cutting amount of the abrasive grains for adjusting the heights can be reduced.

In addition, a placement of the abrasive grains is performed by passing the abrasive grains through the guide holes formed in the template. Thereby, each of the abrasive grains can be placed on respective accurate positions in high speed, and a manufacturing operation of the grinding stone can be carried out in a short time.

In this method, the electrolytic deposition step may include: a provisional electrolytic deposition step of performing a provisional electrolytic deposition while the template is kept to be disposed above the base member; and a main electrolytic deposition step which is carried out by retreating the template after the provisional electrolytic deposition. Thereby, sticking strengths of the abrasive grains is improved so that a longevity of the grinding stone can be extended.

In this method, the abrasive grains may be placed on the base member immersed in an electrolytic deposition solution in an electrolytic deposition bath for performing the electrolytic deposition step. By immersing the base member in the electrolytic deposition solution, it can be possible to prevent inconveniences such that the abrasive grains are shifted or rolled in a transporting step or the immersing step from occurring, and it can be also possible to prevent a weakening of the sticking strengths of the abrasive grains from occurring thanks to a prevention an oxidization of the base member.

Moreover, in accordance with one or more embodiments of the invention, a manufacturing apparatus of a grinding stone, which is manufactured by attaching abrasive grains respectively having polyhedral shapes in which mutually opposed surfaces are parallel to each other to a base member, is provided with: an abrasive grains classifying apparatus adapted to classify the abrasive grains based on sizes of the abrasive grains defined by face-to-face distances between the mutually opposed surfaces; and an attaching apparatus adapted to attach the abrasive grains classified by the abrasive grains classifying apparatus to the base member. The attaching apparatus includes: a template which is disposed above the base member to be movable with respect to the base member and formed with a guide hole through which the classified abrasive grains pass; a vibration generator connected to the template or the base member and adapted to apply a vibration to the abrasive grains passing through the template; and an electrolytic deposition bath adapted to electrolytic deposit the abrasive grains passing through the template.

This apparatus includes the vibration generator for applying the vibration to the abrasive grains passing through the template. By applying the vibration to the abrasive grains, the broader surfaces of the abrasive grains become to come into contact with the base member. In the abrasive grains of the polyhedral shapes, the face-to-face distances between the mutually opposed surfaces may be different to each other. In this case, the distance between broader surfaces is smaller than the distance between narrower surfaces. That is, by making the broader surface of the abrasive grain to come into contact, the projecting amount from the base member can be smallest. Thus, the projecting heights of the abrasive grains from the base member are adjusted to the smallest heights of the abrasive grains, so that the cutting amount of the abrasive grains for adjusting the heights can be reduced.

Other aspects and advantages of the invention will be apparent from the following description and the appended claims.

DESCRIPTION OF EMBODIMENTS

Exemplary embodiments of the invention are described with reference to the accompanying drawings.

Figure 1:
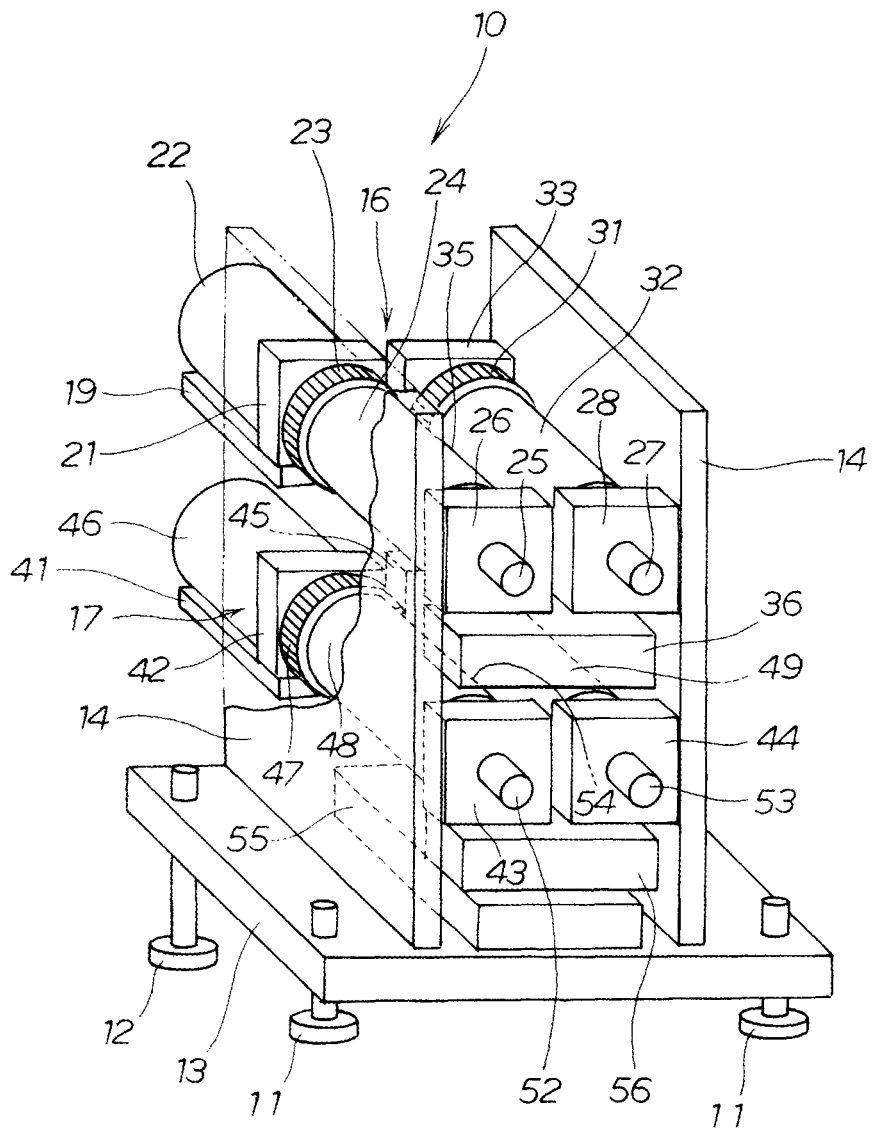
FIG. 1 is a perspective view of an abrasive grains classifying apparatus according to an exemplary embodiment of the invention.

As shown in FIG. 1, an abrasive grains classifying apparatus 10 includes front leg portions 11, 11, rear leg portions 12 (the rear leg portion disposed on the deep side is not shown) respectively longer than the front leg portions 11, 11, a base table 13 supported on the different-length leg portions 11, 12 and formed obliquely with respect to the horizontal axis, vertical walls 14, 14 respectively supported on the base table 13, a first classifying mechanism 16 supported on the upper portions of the vertical walls 14 for selecting abrasive grains, and a second classifying mechanism 17 disposed downwardly of the first classifying mechanism 16 for further selecting the abrasive grains that have passed through the first classifying mechanism 16.

The first classifying mechanism 16 includes a bearing block 21 which is supported on the left vertical wall 14 and on the lower surface of which a flange 19 is to be disposed; a first actuator 22 the shaft of which is supported on the bearing block 21 and the main body of which is supported on the flange 19; a first roller 24 serving as a rigid body which can be rotated by the first actuator 22 and on the end portion of which there is disposed a drive gear 23; a bearing block 26 for rotatably supporting the leading end shaft 25 of the first roller 24; a bearing block 28 for rotatably supporting a shaft 27 disposed spaced a predetermined distance from the shaft 25 supported on the bearing block 26; a first roller 32 on which there is disposed a driven gear 31 in contact with the drive gear 23 and also which, when the first actuator 22 is operated, can be rotated together with the driven gear 31; a bearing block 33 for supporting the first roller 32; a first gap portion 35 which is formed between the first rollers 24 and 32, and also to the upper surface of which there are fed abrasive grains; and, an abrasive grains take-out box 36 which is disposed downstream downwardly of the first rollers 24, 32 and to which there are fed the abrasive grains that have not passed through the first gap portion 35.

Description will be given later of the abrasive grains that have passed through the first gap portion 35.

The second classifying mechanism 17 is basically similar in structure to the first classifying mechanism 16 and thus can be operated similarly.

That is, the second classifying mechanism 17 includes: a flange 41; bearing blocks 42, 43, 44 and 45; a second actuator 46; a drive gear 47; second rollers 48 and 49; shafts 52 and 53; a driven gear; a second gap portion 54; and, an abrasive grains take-out box 56.

The second gap portion 54 is structured such that its gap is narrower than the first gap portion 35. Also, downwardly of the second rollers 48 and 49, there is disposed an abrasive grains take-out box 55 into which the abrasive grains having passed through the second gap portion 54 are allowed to drop down.

Description will be given below of the flow of the abrasive grains with reference to FIG. 2.

Figure 2:
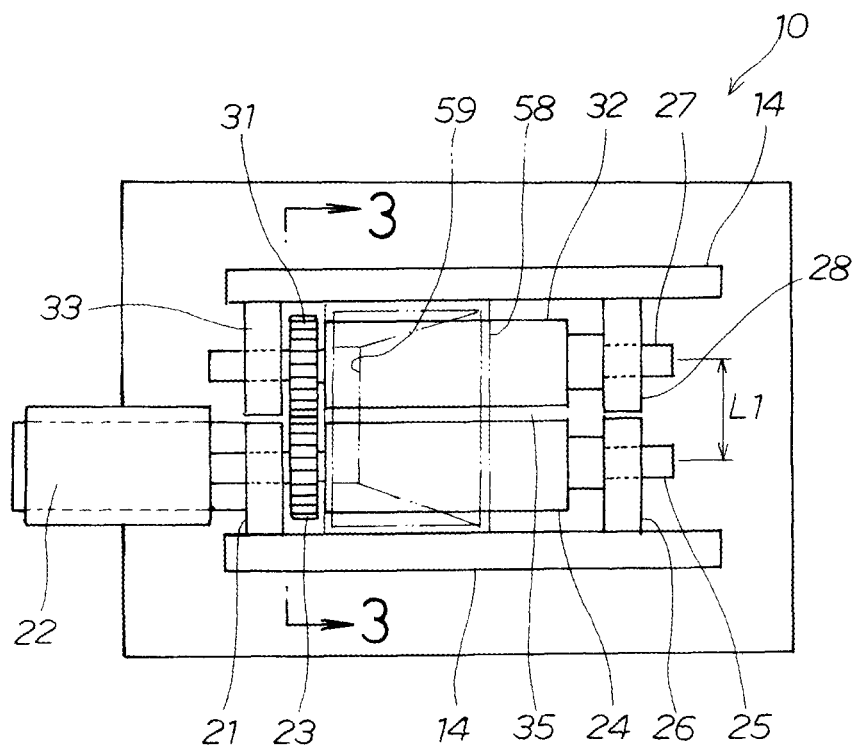
FIG. 2 is a plan view of the abrasive grains classifying apparatus.

As shown in FIG. 2, the abrasive grains are fed to a hopper 58 shown by an imaginary line, and the abrasive grains are then fed from the abrasive grain feed port 59 of the hopper 58 toward the first gap portion 35. The abrasive grain feed port 59, preferably, may be disposed upstream of the first gap portion 35. Due to this, the abrasive grains are allowed to pass from upstream (in FIG. 2, the left side) of the first gap portion 35 to downstream (in FIG. 2, the right side) thereof. Since the abrasive grains classification is carried out depending on whether the abrasive grains can pass through the first gap portion 35 or not, the longer the passing distance of the abrasive grains is, the more accurate the classification is.

When the first actuator 22 is driven, the shaft 25 is rotated. With the rotation of the shaft 25, there are also rotated the first roller 24 and drive gear 23 which are respectively disposed on the shaft 25. With the rotation of the drive gear 23, there is also rotated the driven gear 31. When the driven gear 31 is rotated, there is also rotated the shaft 27 that is inserted through the driven gear 31, thereby rotating the first roller 32 as well that is disposed on the shaft 27. On the other hand, the bearing blocks 21, 26, 28 and 33 respectively support the shafts 25 and 27 while rotating them; and, the bearing blocks 21, 26, 28 and 33 are fixed to the vertical wall 14 and are themselves unmovable. After the first actuator 22 is operated, the abrasive grains are fed from the hopper 58.

The gap of the first gap portion 35 can be managed by adjusting the distance L between the shafts 25 and 27. The first rollers 24 and 32 are respectively formed to have a circular section shape. By controlling the distance between the shafts 25 and 27 of the first rollers 24 and 32, the gap of the first gap portion 35 can be managed. That is, the gap management can be carried out easily.

A driving mechanism of the abrasive grains classifying apparatus is described with reference to FIG. 3.

Figure 3:
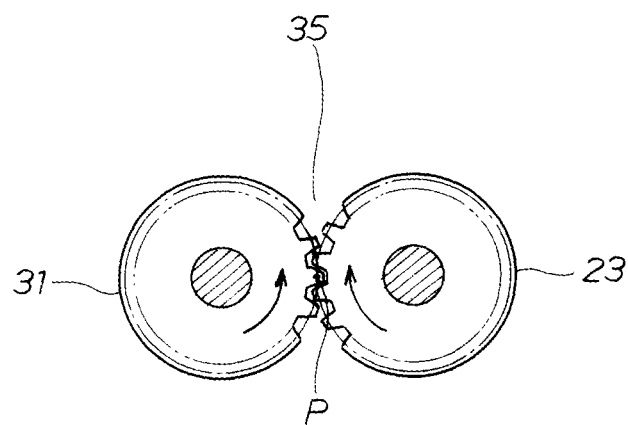
FIG. 3 is a view taken along an arrow line 3-3 shown in FIG. 2.

As shown in FIG. 3, when the drive gear 23 is driven clockwise, the driven gear 31 is driven counterclockwise. Upwardly of a contact point P where these gears 23 and 31 are contacted with each other, there is disposed the first gap portion 35. Therefore, when a force is applied to abrasive grains being fed to the first gap portion 35 in a direction where the abrasive grains are raised up, the abrasive grains are rotated. This can prevent the abrasive grains from biting into between rollers and thus can realize a smooth classifying operation.

An operation of the abrasive grains classifying apparatus is described with reference to FIG. 4.

Figure 4:
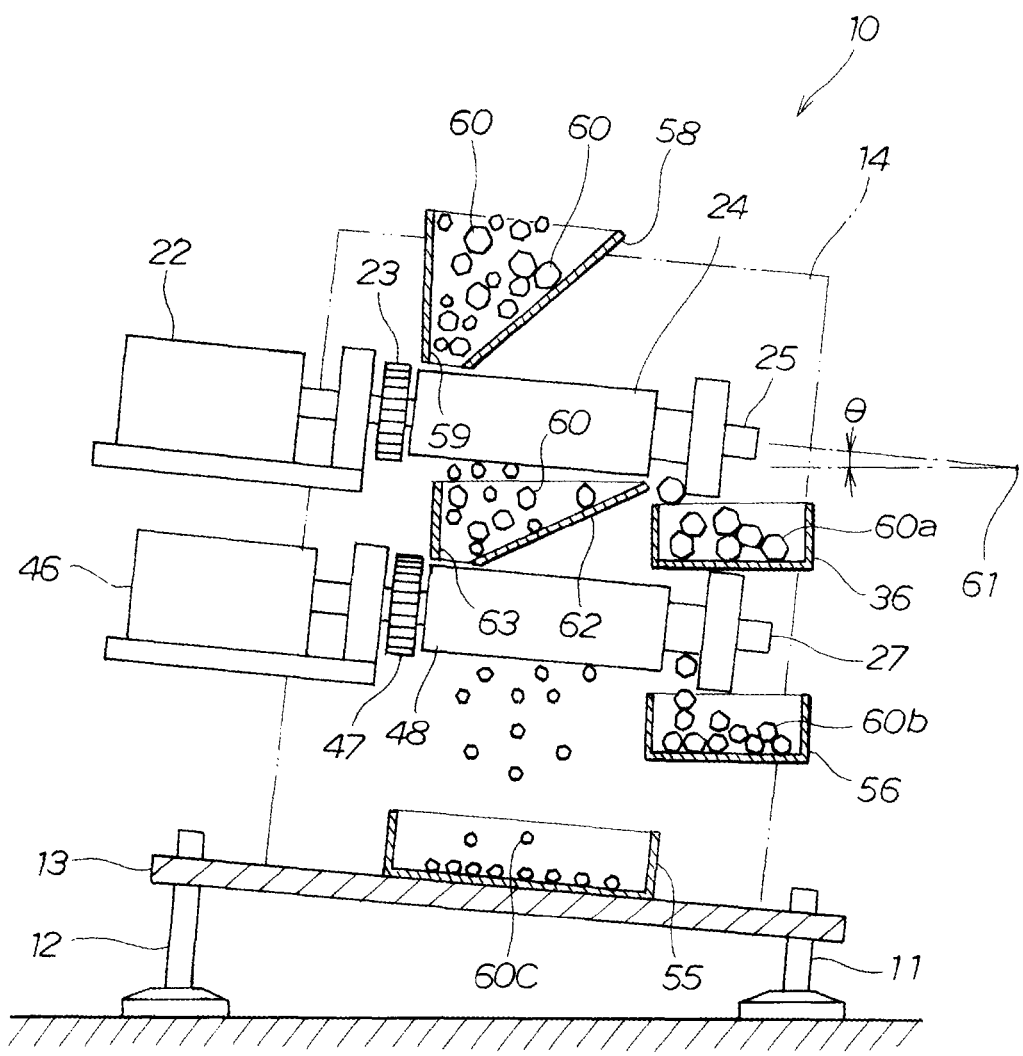
FIG. 4 is an explanatory view of an operation of the abrasive grains classifying apparatus.

As shown in FIG. 4, the abrasive grains 60 are thrown into the hopper 58. The thrown abrasive grains are firstly fed to the upper surface of the first roller 24. In this case, the first roller 24 is disposed such that it is inclined with respect to a horizontal axis 61 (for example, at an angle of inclination of 10°). Owing to this, the abrasive grains 60 are allowed to roll and move under the weight of itself. Abrasive grains 60a (a character "a" is a subscript which means the abrasive grains that have not passed through the first roller 24), which are unable to pass through the first roller 24, are allowed to drop down into the abrasive grains take-out box 36.

The abrasive grains 60 having passed through the gap of the first roller 24 are allowed to drop down into a hopper 62 which is disposed downwardly of the first roller 24. The abrasive grains feed port 63 of the hopper 62, similarly to the hopper 58 which is disposed upwardly of the first roller 24, is disposed upstream upwardly of the second roller 48.

The abrasive grains 60 having dropped down into the hopper 62 are fed to the upper surface of the second roller 48. Abrasive grains 60b (a character "b" is a subscript which means the abrasive grains that have not passed through the second roller 48. This applies similarly hereinafter), which are unable to pass through the second roller 48, are allowed to drop down into the abrasive grains take-out box 56. The abrasive grains 60c, (a character "c" is a subscript which means the abrasive grains that have passed through the second roller 48. This applies similarly hereinafter), which have passed through the gap of the second roller 24, are allowed to drop down into the abrasive grains take-out box 55.

The rollers 24 and 48 are respectively disposed inclined with respect to the horizontal axis 61. Owing to this, the abrasive grains 60 not having passed through the gap portions 35 and 54 are allowed to move on the rollers 24 and 48 due to their own weights. Since the abrasive grains are not allowed to stay in one portion, the next abrasive grains 60 can be fed and thus the classifying operation can be carried out smoothly.

Next, the classifying operation is described with reference to FIG. 5(a) to FIG. 5(c).

Figure 5A:
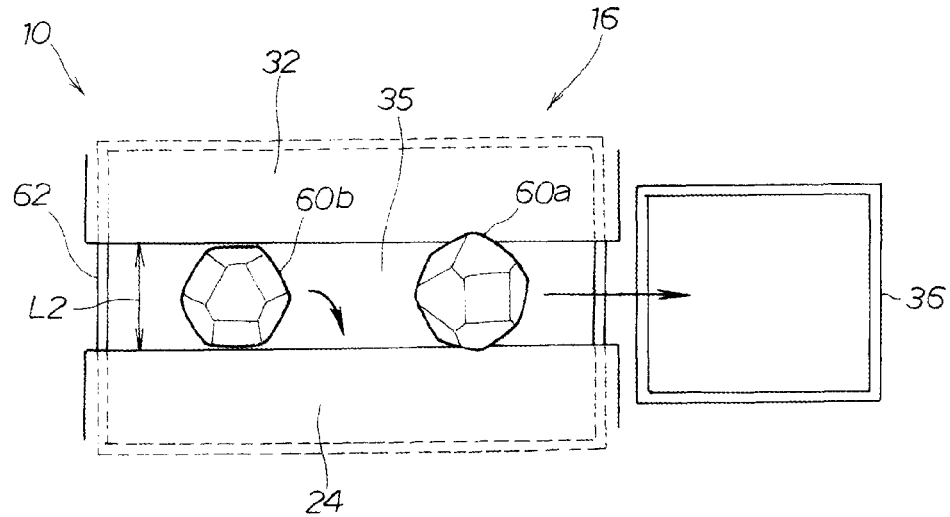
FIG. 5(a) to FIG. 5(c) are explanatory views of an operation of a gap portion and an abrasive grain.

As shown in FIG. 5(a), the width of the first gap portion 35 is set, for example, for L2 (L2=475 µm). Abrasive grains 60a larger in size than this width are allowed to roll on the first rollers 24 and 32 and drop down into the abrasive grains take-out box 36. On the other hand, abrasive grains 60b, 60c smaller in size than this width (L2) are allowed to drop down from the first gap portion 35 into the hopper 62.

Figure 5B:
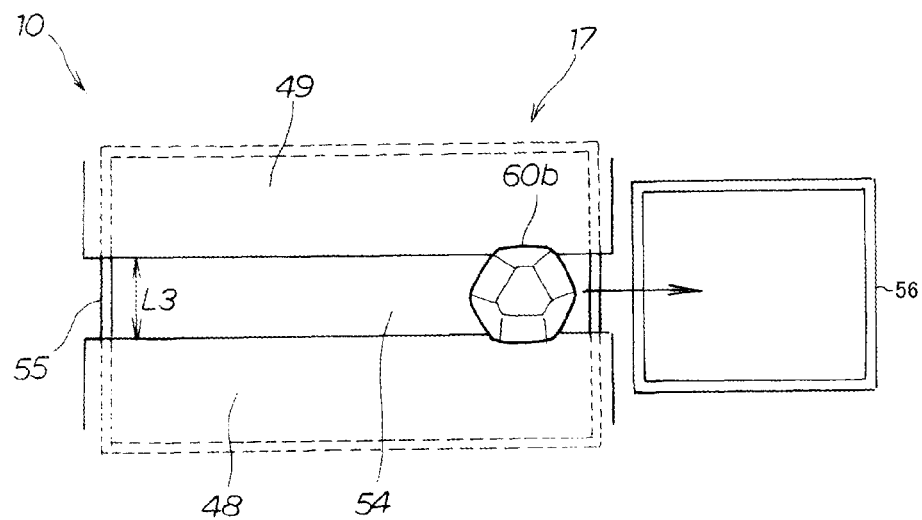

The abrasive grains 60b, 60c having dropped down into the hopper 62, as shown in FIG. 5(b), are fed to the second rollers 48 and 49. The width of the second gap portion 54 formed in the gap between the second rollers 48 and 49 is set, for example, for L3 (L3=465 µm). Abrasive grains 60b larger in size than this width (L3) are allowed to roll on the second rollers 48 and 49 and drop down into the abrasive grain take-out box 56. As can be understood from FIG. 5(a) and FIG. 5(b), the abrasive grains 60b are abrasive grains which are smaller than the predetermined size (width) L2 and are larger than the predetermined size (width) L3.

Thus, the classifying operation is carried out in the following manner. Specifically, since there are formed gaps respectively between the rollers 24 and 32, as well as between the rollers 48 and 49, there are formed the first gap portion 35 and second gap portion 54 respectively, and the abrasive grains 60 are then fed to these gap portions 35 and 54. The abrasive grains 60 larger in size than the gaps are not allowed to pass through the gap portions 35 and 54, while the abrasive grains 60 smaller in size than the gaps are allowed to pass through the gap portions 35 and 54. The abrasive grains 60b, which have passed through the first gap portion 35 but have not passed through the second gap portion 54, can be said that their sizes are within a predetermined range. The gap portions 35 and 54 are formed respectively by providing gaps between the rollers 24 and 32 as well as between 48 and 49, and the gaps between the rollers 24, 32 and 48, 49 can be adjusted with high precision. Owing to this, the sizes of the abrasive grains can be managed with high precision.

Figure 5C:
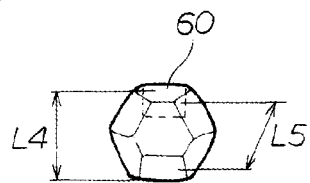

As shown in FIG. 5(c), in an abrasive grain 60 having, for example, a truncated octahedron shape, the face-to-face distance L4 between two mutually opposed hexagonal surfaces is different from the face-to-face distance L5 between two mutually opposed quadrangle surfaces. Let us assume here that L4 is shorter than L5. When L4 is shorter than L2 shown in FIG. 5(a) and is longer than L3 shown in FIG. 5(b), the abrasive grain 60 is fed to the abrasive grains take-out box 56. That is, the abrasive grains 60 are classified according to their sizes that can be determined by the distances between mutually opposed surfaces.

To the grinding stone according to the invention, the abrasive grains 60 accurately classified based on the minimum distances are used. That is, it can be said that, in the abrasive grain 60, the minimum distance (e.g. L4) among the distances is a predetermined distance (the minimum distance is a value within a predetermined range). Thereby, variations of sizes depending on the abrasive grains can be suppressed, so that a cutting amount of the abrasive grains can be small.

The classifying operation shown in FIG. 5(a) to FIG. 5(c) can be described in the following manner. That is, the abrasive grains are classified by passing them through the gaps formed respectively between the rollers 24 and 32 as well as between 48 and 49. When the smallest height portions of the abrasive grains 60 are shorter than the gaps, the abrasive grains 60 are allowed to pass through the gap portions 35 and 54. Thus, the classification of the abrasive grains 60 can be controlled using the minimum height portions of the abrasive grains 60. When such abrasive grains 60 are applied to a grinding stone, by arranging the heights of the abrasive grains 60 according to the smallest heights of the abrasive grains 60, the projecting amount of the abrasive grains 60 can be arranged. This can reduce the cutting amount of the abrasive grains 60.

Here, although description has been given above with reference to an example in which the abrasive grains 60 have a truncated octahedron shape, even when the abrasive grains 60 have other polyhedral shape than the truncated octahedron shape, the classification can be controlled according to the smallest heights of the abrasive grains.

A further embodiment of the abrasive grains classifying apparatus is described with reference to FIG. 6.

Figure 6:
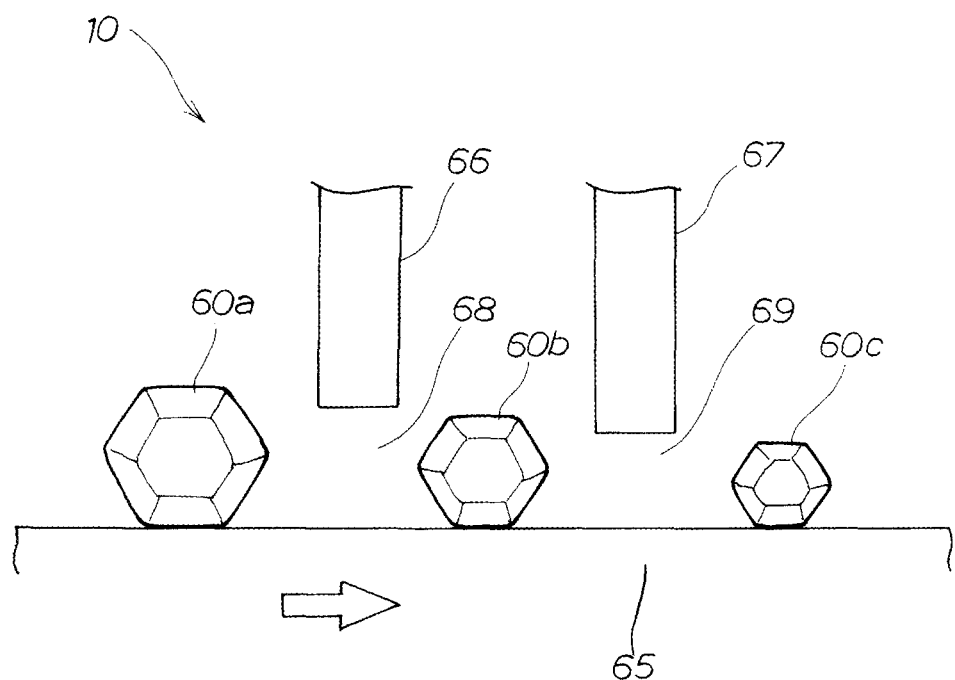
FIG. 6 is a view showing an another embodiment of the abrasive grains classifying apparatus.

As shown in FIG. 6, upwardly of a rigid body 65 such as a conveyor which can be operated in such a manner as shown by a white arrow, there can also be disposed two rigid bodies 66 and 67. In this case, a gap portion, which is formed between the rigid bodies 65 and 66, is a first gap portion 68; and, a gap portion, which is formed between the rigid bodies 65 and 67 in such a manner that it is narrower than the first gap portion 68, is a second gap portion 69.

In this structure as well, the sizes of the abrasive grains 60 can be controlled with high accuracy.

A still further embodiment of the abrasive grains classifying apparatus of the invention is described with reference to FIG. 7.

Figure 7:
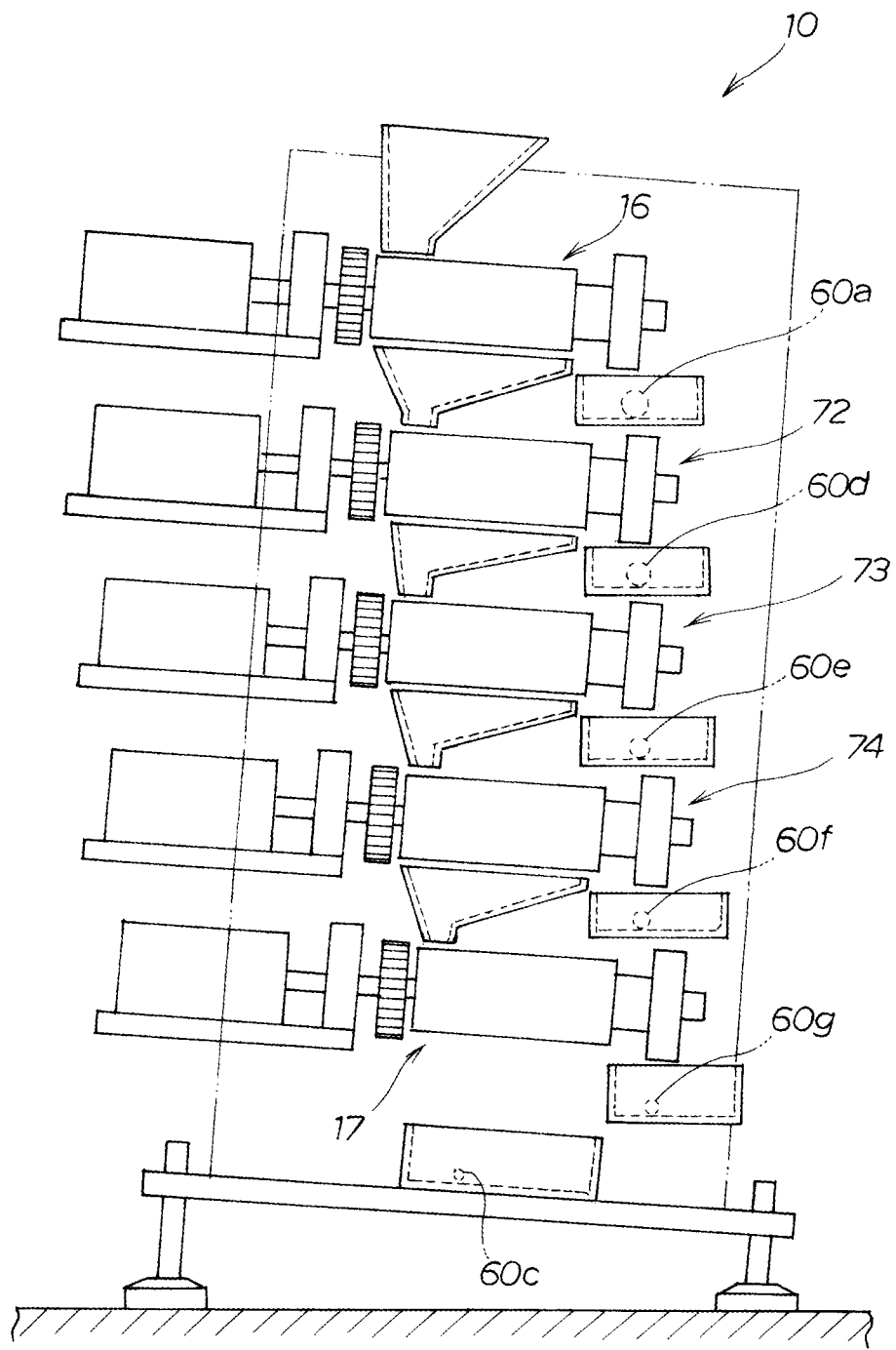
FIG. 7 is a view showing a further another embodiment of the abrasive grains classifying apparatus.

As shown in FIG. 7, between the first classifying mechanism 16 for removing abrasive grains larger than a predetermined size and the second classifying mechanism 17 for removing abrasive grains smaller than a predetermined size, there are interposed a third classifying mechanism 72, a fourth classifying mechanism 73 and a fifth classifying mechanism 74.

Owing to this structure, the abrasive grains 60 can be classified to abrasive grains 60d to 60g that have not passed through the second classifying mechanism 17 to the fifth classifying mechanisms 74. Also, in this case as well, the sizes of the abrasive grains 60 can be controlled with high accuracy.

An apparatus for attaching the classified abrasive grains to the base member is described with reference to FIG. 8.

Figure 8:
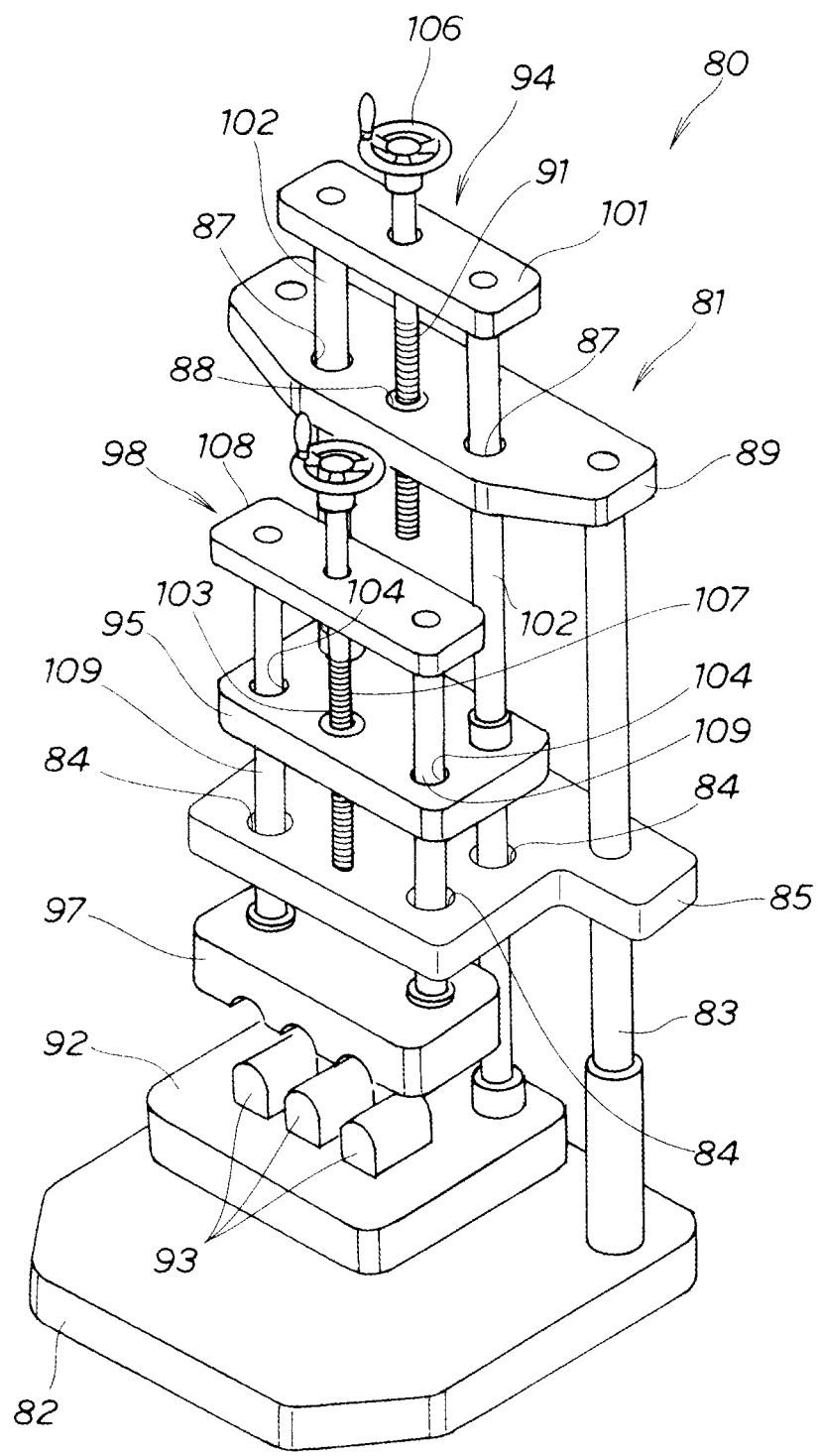
FIG. 8 is a perspective view of an attaching apparatus according to the exemplary embodiment of the invention.

As shown in FIG. 8, an attaching apparatus 80 is configured by disposing a work elevating device 81 in an electrolytic deposition bath (detailed description will be discussed later). The work elevating device 81 is structured by a base table 82, a main pillar 83 supported on the base table 82, a center supporting plate 85 attached to a center of the main pillar 83 and to which guide portions 84, 84, 84 (the guide portion in a left deep side is not shown) are provided, an upper supporting plate 89 attached to an upper end of the main pillar 83 and to which guide portions 87, 87 and female thread hole 88 are provided, a first lift mechanism 94 including a male thread member 91 penetrating through the female thread hole 88 of the upper supporting plate 89 and adapted to elevate the base member 93 placed on a lower plate 92, and a second lift mechanism 98 supported by a center plate 95 of the first lift mechanism 94 and adapted to elevate a template 97 at a lower end.

The first lift mechanism 94 is structured by an upper plate 101 for rotatably supporting the male thread member 91, first pillars 102, 102 extending in a lower side from the upper plate and supporting the lower plate 92, and the center plate 95 which is supported in a center of the first pillar 102, 102 and supports the second lift mechanism 98 by the female thread hole 103 and on which guide portions 104, 104 are arranged.

When a handle 106 disposed in an upper portion of the male thread member 91 is rotated, the male thread member 91 rotates and the male thread member 91 and the handle 106 are elevated together with respect to the female thread hole 88. Thereby, the upper plate 101 which rotatably supports the male thread member 91, the first pillars 102, 102 which are supported by the upper plate 101, the center plate 95 and lower plate 92 which are supported by the first pillars 102, 102, the second lift mechanism 98 which is supported by the center plate 95, the base member 93 which is placed on the lower plate 92 are integrally elevated. That is, by rotating the handle 106 of the male thread member 91, portions other than the base table 82, the main pillar 83, and the supporting plates 85, 98 are integrally elevated.

The second lift mechanism 98 is structured by an upper plate 108 which supports a male thread member 107, and second pillars 109, 109 which extends in a lower direction from the upper plate 108 and supports the template 97.

When a handle 112 disposed on an upper portion of the male thread member 107 is rotated, the male thread member 107 rotates, and the male thread member 107 and the handle 112 are integrally elevated with respect to the female thread hole 103. Thereby, the upper plate 108 which rotatably supports the male thread member 107, the second pillars 109, 109 which are supported by the upper plate 108, the template 97 which is supported by the second pillars 109, 109 are integrally elevated. In this occasion, the center supporting plate 85 and the center plate 95 are not elevated.

Details of the attaching apparatus are described with reference to FIG. 9.

Figure 9:
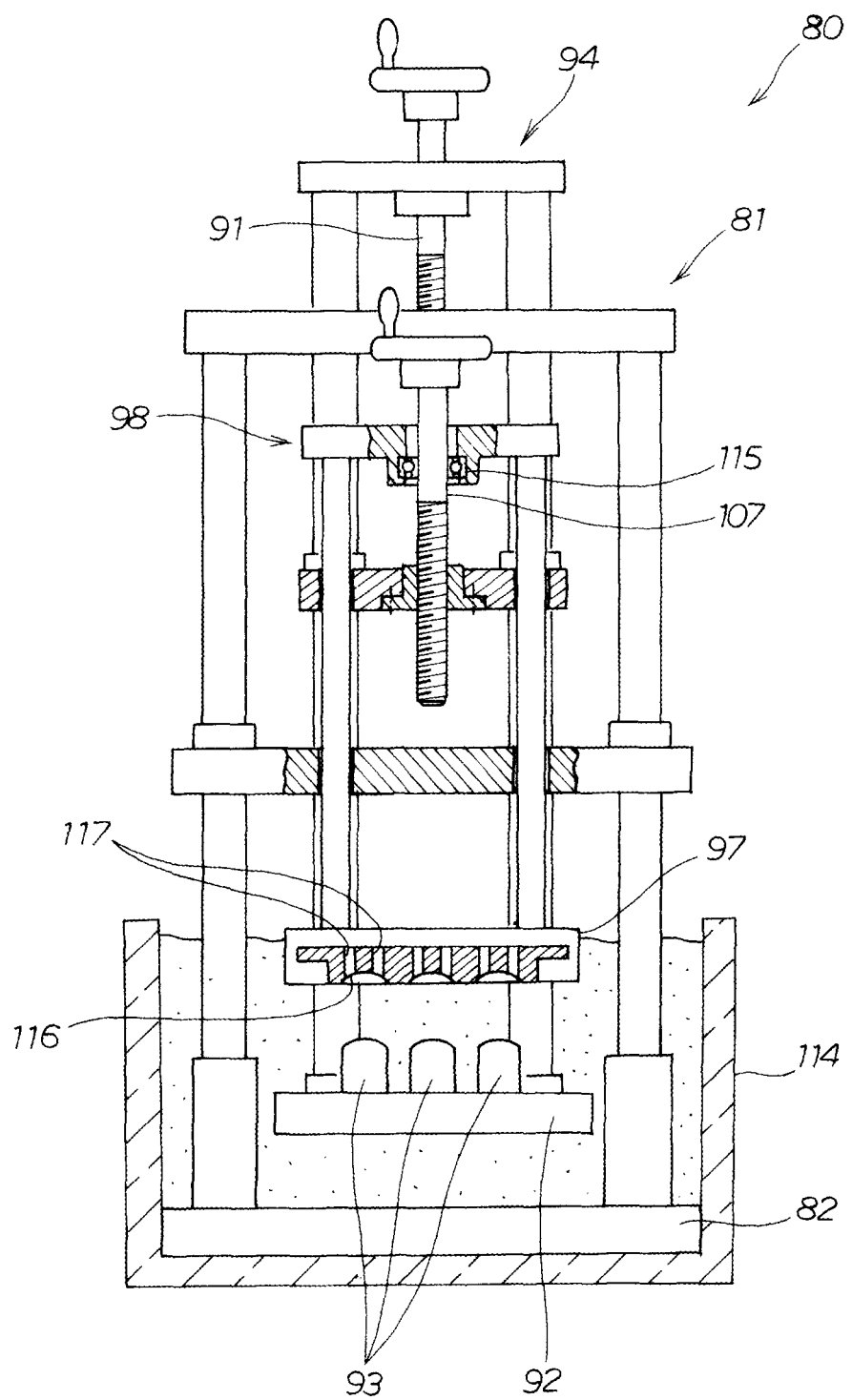
FIG. 9 is a front view of the attaching apparatus.

As shown in FIG. 9, the base table 82 is disposed in the electrolytic deposition bath 114 filled with an electrolytic deposition solution. The male thread member 107 is rotatably supported by a bearing 115, and the male thread member 91 is also supported in a similar manner. In a lower surface side of the template 97, arched portions 116 corresponding to an upper surface of the base member 93 is formed. Guide holes 117 for passing the abrasive grains to the arched portions 116 are provided.

By placing the base member 93 in which an oxide film is removed on an upper surface of the lower plate 92 and lowering the first lift mechanism 94, the base member 93 is set.

Operations of the attaching apparatus are described with reference to FIG. 10(a) to FIG. 10(c).

Figure 10A:
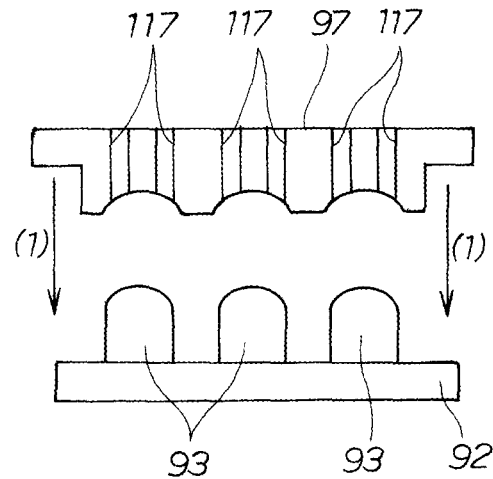
FIG. 10(a) to FIG. 10(c) are explanatory views of a placement step to a vibrating step according to the exemplary embodiment of the invention.

As shown in FIG. 10(a), by lowering the second lift mechanism (98 of FIG. 9), a template 97 is moved down toward upwardly of a base member 93, as shown by arrow lines (1). In this case, the template 97 is lowered in such a manner that there exists a slight gap between the base member 93 and template 97. The reason for this will be given later.

Figure 10B:
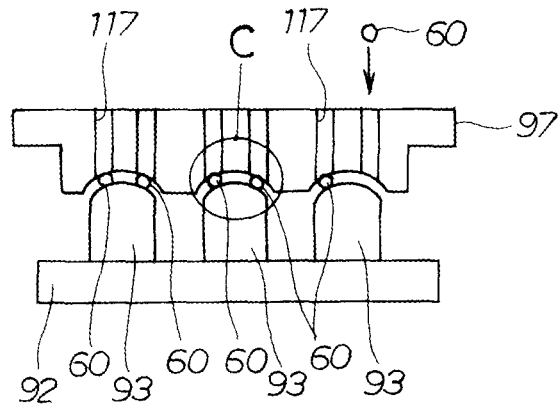

Next, as shown in FIG. 10(b), the abrasive grains 60 are placed on the upper surface of the base member 93 through guide holes 117. The placement of the abrasive grains 60 may be carried out by passing the abrasive grains 60 through the guide holes 117 formed in the template 97. Owing to this, the abrasive grains 60 can be placed at proper positions quickly. This makes it possible to carry out a grinding stone manufacturing operation in a short time.

Also, the placement step is carried out in a state where the base member 93, which has previously received an oxide film removing treatment, is immersed in an electrolytic deposition solution. Here, there is known a method in which, after the abrasive grains are placed outside an electrolytic deposition bath, the base member is delivered to the electrolytic deposition bath and is then immersed into the electrolytic deposition solution. However, this method has a problem that, in the base member delivering and immersing steps, the abrasive grains can slide or roll. On the other hand, when the placement of the abrasive grains 60 is carried out in the electrolytic deposition solution, this problem can be solved; and also, in the grinding stone manufacturing process, the oxidation of the base member can be prevented, which makes it possible to prevent the sticking strength of the abrasive grains 60 from lowering.

Figure 10C:
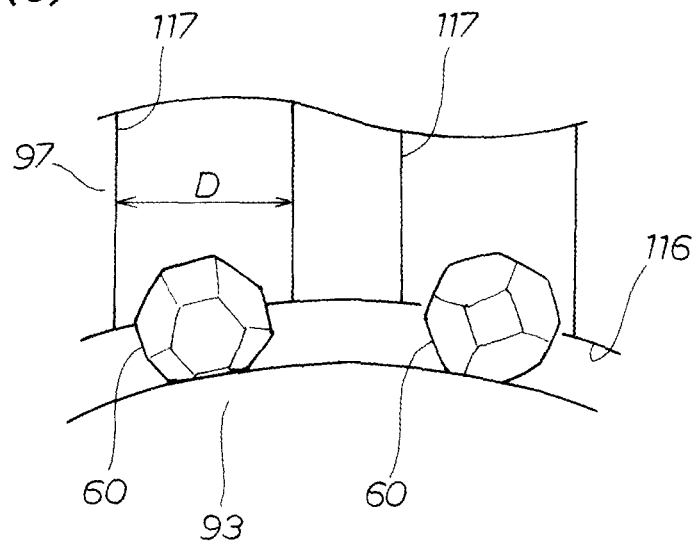

In this case, as shown in FIG. 10(c) which is the enlarged view of the c portion shown in FIG. 10(b), there exist an abrasive grain like an abrasive grain 60 shown on the left the hexagonal surface of which is in contact with the base member 93, and an abrasive grain like an abrasive grain 60 shown on the right the square surface of which is in contact with the base member 93. Vibrations are given to the thus placed abrasive grains 60. The vibrations are given by a vibration generator which is connected to the template 97 or base member 93.

When the vibrations are given, since the diameter D of the guide hole 117 is larger than the abrasive grains 60, the abrasive grains 60 are caused to roll due to such vibrations. When rolling, most of the abrasive grains 60 are contacted with the base member 93 in the relatively broader surfaces thereof in such a manner that the heights of the abrasive grains 60 become the smallest.

That is, to bring the broader surfaces of the abrasive grains 60 into contact with the base member 93 can minimize the projecting amount of the abrasive grains 60 from the base member 93. The projecting heights of most of abrasive grains 60 can be arranged at the smallest heights of the abrasive grains 60 and, when arranging the heights, the cutting amount of the abrasive grains 60 can be reduced.

Further, the terms "most of" mean that the projecting heights are the smallest height thereof are in 80% or more of the abrasive grains.

In abrasive grains 60 which have a polyhedron shape, the distances between the mutually opposed surfaces thereof can vary. To bring the broader surfaces of the abrasive grains 60 into contact with the base member 93 can minimize the projecting amount thereof from the base member 93. The projecting heights of the most of abrasive grains 60 can be arranged at the smallest heights of the abrasive grains 60 and, when arranging the heights, the cutting amount of the abrasive grains 60 can be reduced.

Figure 11A:
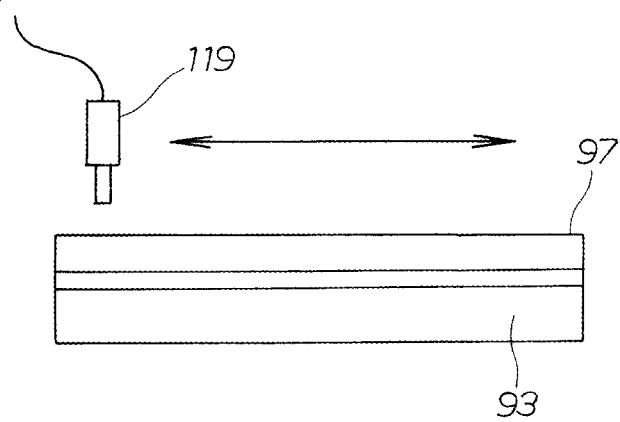
FIG. 11(a) to FIG. 11(c) are explanatory views of an inspecting step and a correcting step.
Figure 11B:
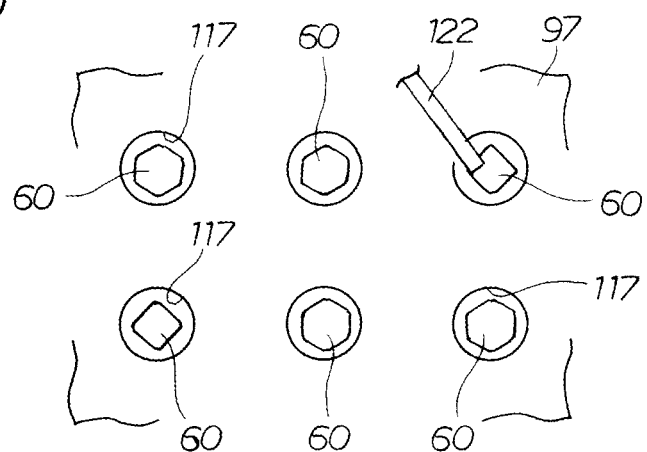
Figure 11C:
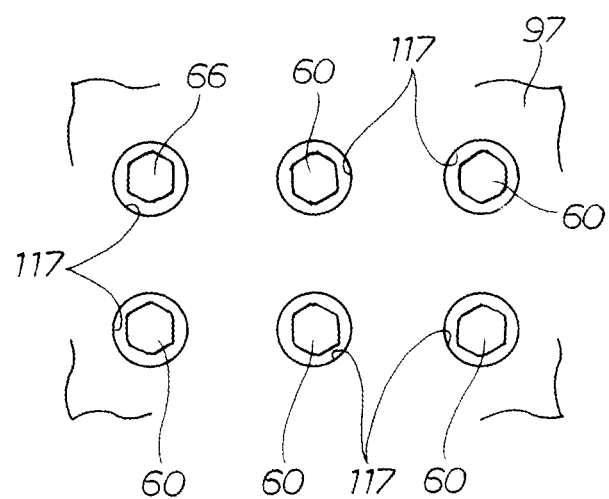

An inspection step and a correction step in order to accurately place the placed abrasive grains at the smallest heights (that is, in the case of the abrasive grains having truncated octahedron shape, in order to accurately placing at the hexagonal surfaces) are described referring to FIG. 11(a) to FIG. 11(c).

As shown in FIG. 11(a), an inside of the guide hole 117 is scoped by a camera 119 from an upper side of the template 97. In this time, it is inspected whether the abrasive grain 60 seen in the guide hole 117 is placed at the smallest height. Specifically, it is inspected whether the broader surface of the abrasive grain 60 is placed on the base member 93. (In the case of the abrasive grains having truncated octahedron shape, it is inspected whether a surface of the abrasive grain 60 seen from the guide hole 117 is hexagonal or quadrangle.)

Then, as shown in FIG. 11(b), an abrasive grain 60i (a character "i" is a subscript which means the abrasive grain in which a surface seen from the guide hole 117 is a narrow surface) in which a surface seen from the guide hole 117 is a narrow surface (that is, the quadrangle surface in the case of the abrasive grain of the truncated octahedron shape) is rolled by a pin 112 so that a broad surface (that is, the hexagonal surface in the case of the abrasive grain of the truncated octahedron shape) is seen from the guide hole 117.

As shown in FIG. 11(c), when the surfaces seen from the guide holes 117 are the broad surfaces (that is, the hexagonal surfaces in the case of the abrasive grains of the truncated octahedron shapes) in all abrasive grains, the correction step is ended. By performing the inspection step and the correction step, in the all abrasive grains 60, the projecting heights from the base member 93 are adjusted to the smallest heights. Thereby, the cutting amount of the abrasive grains 60 for adjusting the heights can be further reduced. (In the truncated octahedron shape, an opposed surface of the hexagonal surface is always the hexagonal surface. Accordingly, by placing the abrasive grain 60 so that the hexagonal surface is seen, the hexagonal surface always comes into contact with the base member (93 in FIG. 11(a)). Therefore, by arranging the abrasive grains 60 so that the hexagonal surfaces are seen from the guide holes 117, the projecting amounts can be equalized.)

An electrolytic deposition of the abrasive grains is described with reference to FIG. 12(a) and FIG. 12(b).

Figure 12A:
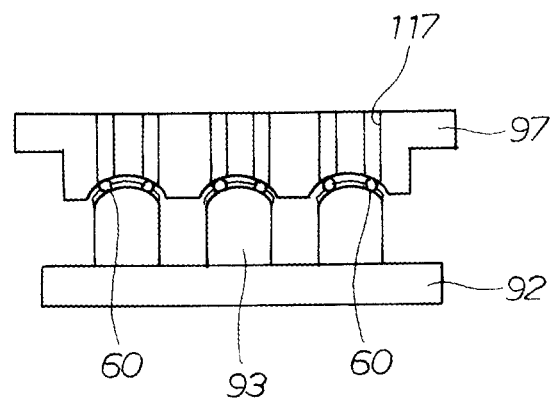
FIG. 12(a) and FIG. 12(b) are explanatory views of an electrolytic deposition step according to the exemplary embodiment of the invention.

As shown in FIG. 12(a), a provisional electrolytic deposition operation is carried out, first. In this case, the provisional electrolytic deposition operation is executed in a state where the template 97 is left disposed in order to prevent the abrasive grains 60 from dropping down from the base member 93. When the template 97 is closely contacted with the base member 93 in the provisional electrolytic deposition, the abrasive grains 60 cannot be electrolytic deposited on the base member 63. In view of this, the template 97 is disposed in such a manner that there is a slight gap between the template 97 and base member 93.

Figure 12B:
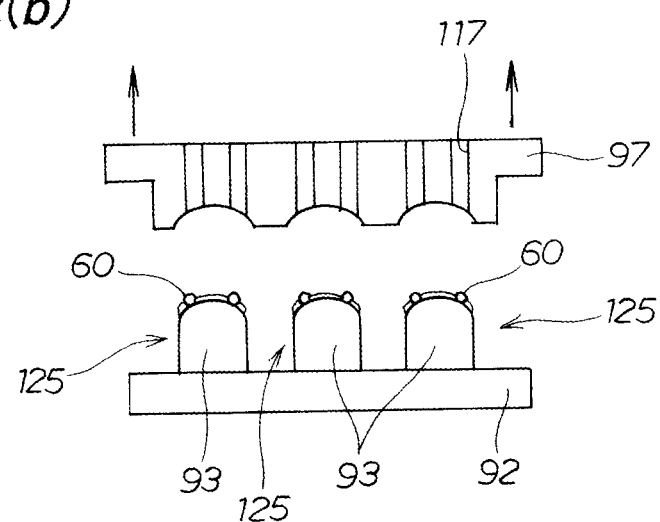

Next, as shown in FIG. 12(b), when a second lift mechanism (not shown) is driven to raise the template 97, the template 97 is retreated and then there is carried out a main electrolytic deposition operation. In this manner, the grinding stone 125 is completed.

The contents of FIG. 12(a) and FIG. 12(b) can be summed up in the following manner. That is, in the electrolytic deposition step, after execution of the provisional electrolytic deposition step, the template 97 is retreated and the main electrolytic deposition step is carried out. In the provisional electrolytic deposition step, the abrasive grains 60 are prevented against shifting and, in the main provisional electrolytic deposition step in which the template 97 is retreated, the abrasive grains 60 are fixed. This can increase the sticking strength of the abrasive grains 60, thereby being able to extend the life of the grinding stone.

The grinding stone manufactured in this manner is described with reference to FIG. 13.

Figure 13:
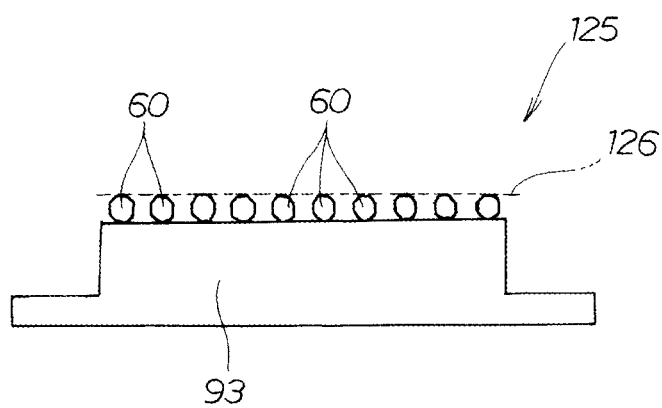
FIG. 13 is an explanation view of a grinding stone of the exemplary embodiment of the invention.

As shown in FIG. 13, the abrasive grains 60 are sticking to the surface of the base member 93. Since the most of the abrasive grains 60 are allowed to stick to the surface having a broader area, the projecting amount of the abrasive grains 60 from the base member 93 can be made the smallest. The projecting heights of the abrasive grains from the base member can be arranged at the smallest heights of the abrasive grains, whereby, when arranging the heights of the abrasive grains, the cutting amount of the abrasive grains can be reduced.

That is, the abrasive grains 60 are disposed such that the minimum distance between the surfaces can provide the projecting heights of the abrasive grains from the base member 93. This can arrange the heights of the abrasive grains 60 in such a manner as shown by a line 126. That is, one of the surfaces providing the minimum distance of the respective abrasive grains 60 is stuck to the base member 93. Owing to this, the projecting heights of the abrasive grains from the base member 93 can be arranged at the smallest heights of the abrasive grains 60 and thus, when arranging the heights of the abrasive grains, the cutting amount of the abrasive grains can be reduced.

Now, the grinding stone manufactured using the abrasive grains classified in FIG. 7 will be described with reference to FIG. 14.

Figure 14:
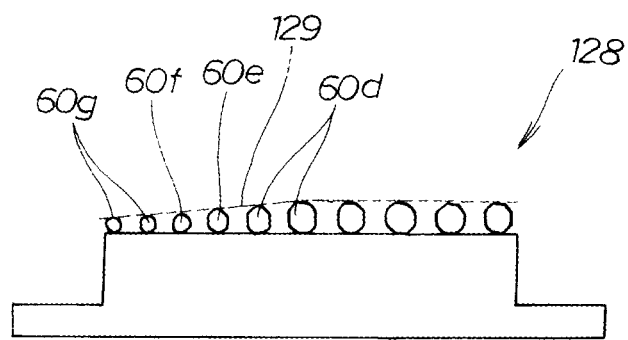
FIG. 14 is a view of a further embodiment of the grinding stone.
Figure 15A:
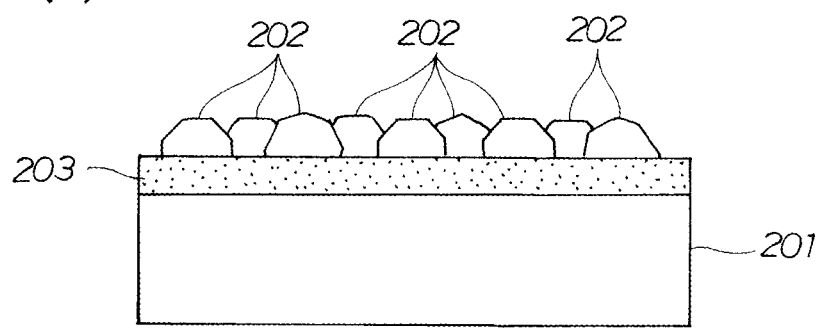
FIG. 15(a) and FIG. 15(b) are explanatory views of a basic structure according to a prior art technology.
Figure 15B:
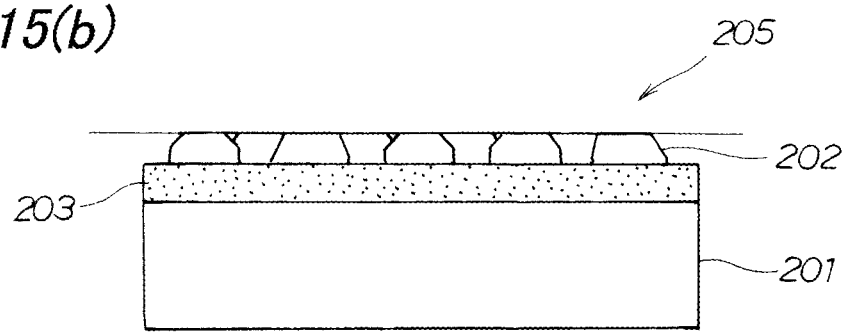

As shown in FIG. 14, in the grinding stone 128, the abrasive grains 60d to 60g classified into plural sizes are disposed on the base member sequentially in the size increasing order. Specifically, the abrasive grains are disposed sequentially in the order starting from the smallest abrasive grains 60g and ending at the large abrasive grains 60d. In this case, as shown by a line 129, the abrasive grains 60 are disposed in such a manner that the leading ends of the abrasive grains 60 are tapered. (That is, the abrasive grains 60 are classified into a plurality of groups based on the minimum distances, and the abrasive grains are arranged on the base member 93 sequentially from the abrasive grains 60g of the group having the smallest minimum distances to the abrasive grains 60d of the group having the largest minimum distances.) When it is necessary to cut the abrasive grains 60 in a tapered manner, by previously disposing the abrasive grains 60 in such a manner that the leading ends of the abrasive grains 60 are tapered, the cutting amount of the abrasive gains 60 can be reduced.

Further, by combining portions where the abrasive grains 60 are arranged in taper parts and a portion where the abrasive grains are arranged in a straight part (see FIG. 13), a grinding stone having a trapezoidal outer shape can be obtained. Moreover, by turning two taper parts of the arrangement of the abrasive grains, a grinding stone having a chevron outer shape can be obtained. That is, the "taper shape" include an outer shape of in which a part of the outer shape has a taper portion.

Besides, the abrasive grains 60 may be arranged on the base member in arbitrary manner from the abrasive grains 60g having the smallest projecting heights from the base member to the abrasive grains 60d having the largest projecting heights. Since abrasive grains having required sizes are arranged on required position, the cutting amount of these abrasive grains can be reduced.

Here, although the abrasive grains according to the invention have been described heretofore with reference to an example in which they respectively have truncated octahedron shapes, they may also have any one of other polyhedron shapes.

INDUSTRIAL APPLICABILITY

The grinding stone according to the invention is optimum for a grinding-machining. In addition, the technique of manufacturing the grinding stone according to the invention is optimum for manufacturing a grinding stone for the grinding-machining.

DESCRIPTION OF REFERENCE NUMERALS AND SIGNS

60: Abrasive Grain
93: Base member
125, 128: Grinding Stone
10: Abrasive grain classifying apparatus
80: Attaching Apparatus
97: Template
114: Electrolytic Deposition Bath
117: Guide Hole

The invention claimed is:

1. A grinding stone comprising:
a base member; and
a plurality of abrasive grains,
wherein each of the abrasive grains is attached to the base member, each of the abrasive grains has a polyhedral shape in which mutually opposed surfaces are parallel to each other, and distances between a first pair of the mutually opposed surfaces are different from other pairs of mutually opposed surfaces depending on the polyhedral shape of the abrasive grains,
wherein, in each of the abrasive grains, a minimum distance of said distances is a value within a predetermined range, and
wherein 80% or more of the abrasive grains are arranged in a state such that a surface of one of the parallel opposed surfaces of each of the plurality of abrasive grains, which has said minimum distance therebetween, is in contact with a surface of the base member so that a projecting height of each of said 80% or more of the abrasive grains from the base member corresponds to said minimum distance.

2. The grinding stone according to claim 1, wherein a difference between a maximum value and a minimum value of said predetermined range is substantially 10 μm.

3. The grinding stone according to claim 2, wherein said most of the abrasive grains comprises 80% or more of all abrasive grains in the grinding stone.

4. A grinding stone comprising:
a base member; and
a plurality of abrasive grains,
wherein each of the abrasive grains is attached to the base member, each of the abrasive grains has a polyhedral shape in which mutually opposed surfaces are parallel to each other, and distances between a first pair of the mutually opposed surfaces are different from other pairs of mutually opposed surfaces depending on of the polyhedral shape of the abrasive grains,
wherein, in each of the abrasive grains, a minimum distance of said distances is a value within a predetermined range, and
wherein the abrasive grains are arranged in a state such that a surface of one of the parallel opposed surfaces of each of the plurality of abrasive grains, which has said minimum distance therebetween, is in contact with a surface of the base member so that a projecting height of each abrasive grain from the base member corresponds to said minimum distance.

5. The grinding stone according to claim 4, wherein a difference between a maximum value and a minimum value of said predetermined range is substantially 10 μm.

6. A grinding stone comprising:
a base member; and
a plurality of abrasive grains,
wherein each of the abrasive grains is attached to the base member and has a truncated octahedron shape including hexagonal surfaces and quadrangle surfaces in which mutually opposed surfaces are parallel to each other, and distances between a first pair of the mutually opposed surfaces are different from other pairs of mutually opposed surfaces depending on of the truncated octahedron shape of the abrasive grains,
wherein, in each of the abrasive grains, a minimum distance of said distances is a value within a predetermined range, and
wherein 80% or more of the abrasive grains are arranged in a state such that a surface of one of the parallel opposed surfaces of each abrasive grain, which has said minimum distance therebetween, is attached to the base member so that a projecting height of each of said 80% or more of the abrasive grains from the base member corresponds to said minimum distance.

7. The grinding stone according to claim 6, wherein a difference between a maximum value and a minimum value of said predetermined range is substantially 10 μm.

8. A grinding stone comprising:
a base member; and
a plurality of abrasive grains,
wherein each of the abrasive grains is attached to the base member, each of the abrasive grains has a polyhedral shape in which mutually opposed surfaces are parallel to each other, and distances between a first pair of the mutually opposed surfaces are different from other pairs of mutually opposed surfaces depending on of the polyhedral shape of the abrasive grains,
wherein the abrasive grains are arranged in a state such that a surface of one of the parallel opposed surfaces of each abrasive grain, which has a minimum distance therebetween, is in contact with a surface of the base member in arbitrary manners from abrasive grains having a minimum projecting height from the base member to abrasive grains having a maximum projecting height.

9. The grinding stone according to claim 8, wherein the abrasive grains include a plurality of groups classified based on a minimum distance of said distances in each of the abrasive grains, wherein the abrasive grains are arranged on the base member in a sequence from the abrasive grains of a group having a smallest minimum distance to the abrasive grains of a group having a greatest minimum distance so that an outer shape of the grinding stone has a taper shape.

10. The grinding stone according to claim 9, wherein, in each of the groups, the minimum distance of said distances is a value within a predetermined range in each of the abrasive grains, and a difference between a maximum value and a minimum value of said predetermined range is substantially 10 μm.

11. A manufacturing method of a grinding stone which is manufactured by attaching a plurality of abrasive grains respectively having polyhedral shapes in which mutually opposed surfaces are parallel to each other to a base member, the method comprising:

a classifying step of classifying the abrasive grains based on sizes of the abrasive grains defined by distances between the mutually opposed surfaces and the polyhedral shape of the abrasive grains, wherein distances between a first pair of mutually opposed surfaces are different from distances between other pairs of mutually opposed surfaces depending on the polyhedral shape, wherein, in each of the abrasive grains, a minimum distance of said distances is a value within a predetermined range; and an attaching step of attaching the abrasive grains classified in the classifying step to the base member in a state such that a surface of one of the parallel opposed surfaces of each abrasive grain, which has a minimum distance therebetween, is in contact with the upper surface of the base member so that a projecting height of each of said abrasive grains from the base member corresponds to said minimum distance, wherein the attaching step includes:

a placement step of placing the abrasive grains classified in the classifying step onto an upper surface of the base member using a template disposed above the base member;

a vibrating step of applying a vibration to the placed abrasive grains and making broader surfaces of the respective abrasive grains to come in contact with the base member; and an electrolytic deposition step of electrolytic depositing the abrasive grains to which the vibration is applied.

12. The manufacturing method of a grinding stone according to claim 11, wherein the electrolytic deposition step includes:

a provisional electrolytic deposition step of performing a provisional electrolytic deposition while the template is kept to be disposed above the base member; and a main electrolytic deposition step which is carried out by retreating the template after the provisional electrolytic deposition.

13. The manufacturing method of a grinding stone according to claim 11, wherein, in the placement step, the abrasive grains are placed on the base member immersed in an electrolytic deposition solution in an electrolytic deposition bath for performing the electrolytic deposition step.

14. A manufacturing apparatus of a grinding stone which is manufactured by attaching a plurality of abrasive grains respectively having polyhedral shapes in which mutually opposed surfaces are parallel to each other to a base member, the apparatus comprising:

an abrasive grains classifying apparatus adapted to classify the abrasive grains based on sizes of the abrasive grains defined by distances between the mutually opposed surfaces and the polyhedral shape of the abrasive grains, wherein distances between a first pair of mutually opposed surfaces are different from distances between other pairs of mutually opposed surfaces depending on the polyhedral shape, wherein, in each of the abrasive grains, a minimum distance of said distances is a value within a predetermined range; and an attaching apparatus adapted to attach the abrasive grains classified by the abrasive grains classifying apparatus to the base member in a state such that a surface of on of the parallel opposed surfaces of each abrasive grain, which has a minimum distance therebetween, is in contact with a surface of the base member so that a projecting height of each of said abrasive grains from the base member corresponds to said minimum distance, wherein the attaching apparatus includes:

a template which is disposed above the base member to be movable with respect to the base member and formed with a guide hole through which the classified abrasive grains pass;

a vibration generator connected to the template or the base member and adapted to apply a vibration to the abrasive grains passing through the template; and an electrolytic deposition bath adapted to electrolytic deposit the abrasive grains passing through the template.

15. The manufacturing method of a grinding stone according to claim 12, wherein, in the placement step, the abrasive grains are placed on the base member immersed in an electrolytic deposition solution in an electrolytic deposition bath for performing the electrolytic deposition step.

* * * * *